Patented May 20, 1924.

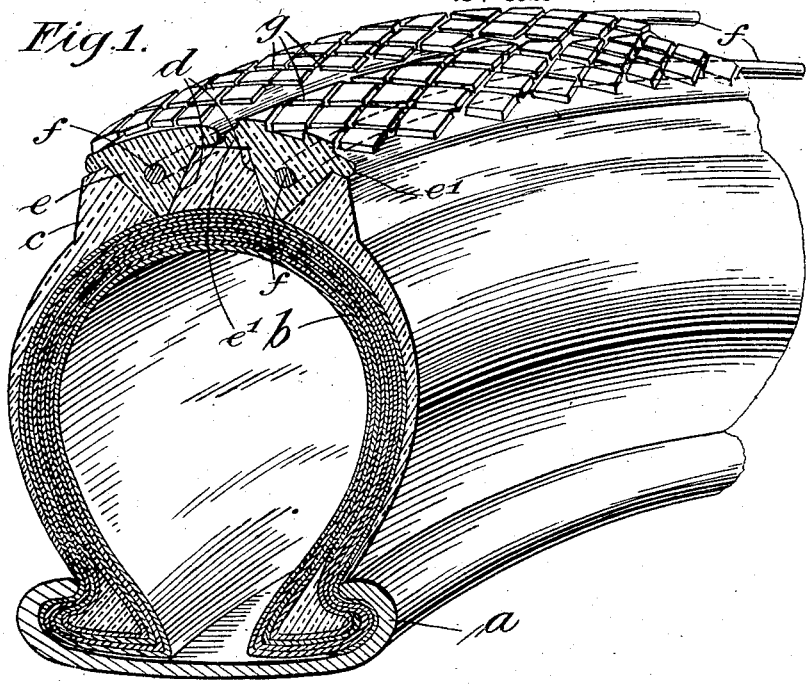
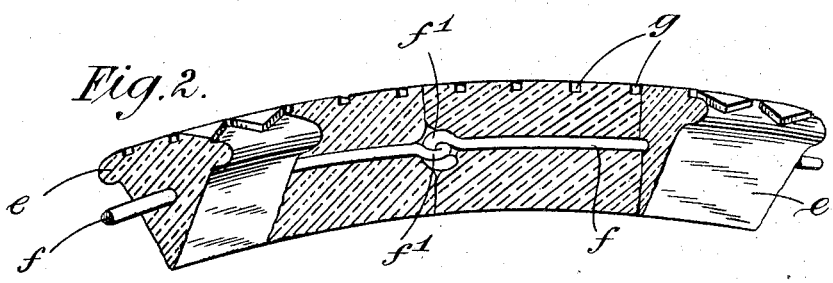
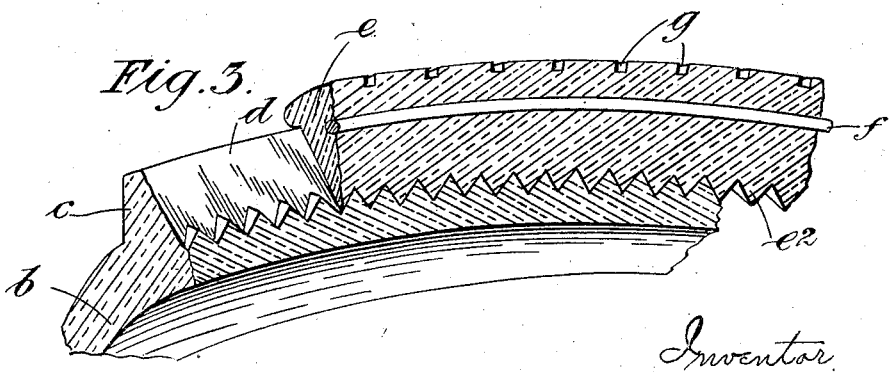

1,494,621

UNITED STATES PATENT OFFICE.

JAMES STUART OGILVIE, OF WOOD GREEN, ENGLAND.

WHEEL TIRE.

Application filed November 26, 1923. Serial No. 677,020.

*To all whom it may concern:*

Be it known that I, JAMES STUART OGILVIE, a subject of the King of Great Britain, and resident of "The Moorings," Densome Wood, Wood Green, Hampshire, England, have invented certain new and useful Improvements in and Connected with Wheel Tires, of which the following is a specification.

This invention relates to wheel tires for vehicles, and the principal object is to provide improved renewable or removable treads applicable to such tires.

More specifically, the object of the invention is to improve tires and tread bands in which the latter are retained in peripheral grooves in the tire by means of wire or like rings embedded in them.

The accompanying drawing, forming part of this specification, illustrates examples of practical constructions embodying these improvements, and in this drawing:

Figure 1 is a sectional perspective view of part of a tire fitted with twin bands constructed and secured in the tread in accordance with these improvements.

Figure 2 is a sectional perspective view of a portion of a tread band similar to those seen in Figure 1, this view illustrating means for connecting together the ends of a band or sections thereof.

Figure 3 is a sectional perspective view of the tread portion of a tire and tread band thereon, this view illustrating means for the prevention of creeping of the band on the tire.

Referring to Figure 1 of the drawing, $a$ is one suitable form of wheel rim on which is mounted a pneumatic tire cover $b$ having its tread portion $c$ made of sufficient thickness and strength for the formation therein of two grooves $d$ $d$ of V-shaped section. Tread bands $e$ of suitable material, as for instance of rubber reinforced with canvas or other reinforcement, are made of a cross section to correspond with the grooves $d$. These bands may be endless and moulded with endless wire rings $f$ embedded in them, the rings being of such a diameter as to retain the tread bands within the grooves $d$, after the mounting of such bands by springing them on to the deflated or partially deflated tire. The outer peripheral portions of the bands are advantageously enlarged laterally at $e'$ so as to overlap on each side the marginal edges of the grooves, the outer surfaces of such peripheral portions being moulded to a suitable configuration, as for instance to the convex curvature shown. These outer surfaces may either be left plain, or they may be moulded with corrugations or studs, or with grooves $g$ giving a diamond or other formation or with other features adapted for imparting a non-slip or other characteristics as may be desired.

Instead of the bands $e$ and wires $f$ being endless as above described, they may be made in sections, or each in one length, and the ends may be connected together by suitable coupling means. For example, in Figure 2, the ends of a length of wire are shown coupled together by hooks $f'$ formed by bending the ends, but it is apparent that other coupling means may be substituted.

In order to prevent creeping of the bands $e$, their inner edges may be moulded in known manner with serrations $e^2$ as seen in Figure 3, and the bottom of the grooves $d$ in the tread may be similarly formed for engaging with the serrations of the bands. However, other known interlocking formations may be employed, if desired.

I claim:

1. A wheel tire comprising a pneumatic shoe or casing having a uniform internal curvature and a thickened tread portion having two parallel peripheral grooves therein, V-shaped in section with marginal flat faces between and on each side of said grooves, separate V-shaped tread bands mounted in the grooves and having lateral flanges extending beyond the grooves and resting on said faces, and a retaining wire inside each of said bands.

2. A wheel tire comprising a pneumatic shoe or casing of the same thickness throughout, and an additional thickened tread portion having parallel annular V-shaped grooves therein and formed with marginal flat faces between and on each side of the grooves, separate V-shaped tread-bands mounted in the grooves and having lateral flanges extending beyond the grooves and resting on said flat faces, and a retaining wire embedded in each band, having interconnecting hooked ends.

JAMES STUART OGILVIE.